US011980164B2

(12) United States Patent
Borg

(10) Patent No.: US 11,980,164 B2
(45) Date of Patent: May 14, 2024

(54) DENTAL STATION AND SYSTEM FOR DOMESTIC ANIMAL DENTAL CARE

(71) Applicant: Brian Borg, Dandenong (AU)

(72) Inventor: Brian Borg, Dandenong (AU)

(73) Assignee: Brian Borg, Dandenong (AU)

( * ) Notice: Subject to any disclaimer, the term of this patent is extended or adjusted under 35 U.S.C. 154(b) by 96 days.

(21) Appl. No.: 17/600,247

(22) PCT Filed: Apr. 1, 2020

(86) PCT No.: PCT/AU2020/050319
§ 371 (c)(1),
(2) Date: Sep. 30, 2021

(87) PCT Pub. No.: WO2020/198791
PCT Pub. Date: Oct. 8, 2020

(65) Prior Publication Data
US 2022/0159930 A1    May 26, 2022

(30) Foreign Application Priority Data
Apr. 1, 2019    (AU) .................................. 2019901096

(51) Int. Cl.
*A01K 15/02*    (2006.01)
*A01K 5/01*    (2006.01)

(52) U.S. Cl.
CPC .............. *A01K 15/026* (2013.01); *A01K 5/01* (2013.01)

(58) Field of Classification Search
CPC ...... A01K 15/026; A01K 15/025; A01K 5/01; A01K 15/02; A01K 5/0114; A01K 29/00; A46B 2200/1086; A61D 5/00
See application file for complete search history.

(56) References Cited

U.S. PATENT DOCUMENTS

| | | | | |
|---|---|---|---|---|
| 5,944,516 A * | 8/1999 | Deshaies | ............... | A61D 5/00 15/167.1 |
| 6,148,771 A * | 11/2000 | Costello | ............... | A01K 15/026 119/709 |
| 6,405,681 B1 * | 6/2002 | Ward | ............... | A01K 15/026 119/707 |
| 6,474,268 B1 * | 11/2002 | Suchowski | .......... | A01K 15/026 119/707 |
| 6,546,896 B1 * | 4/2003 | Markham | ............ | A01K 15/026 119/710 |
| 6,739,287 B1 * | 5/2004 | Sarantis | ............... | A01K 15/026 119/702 |
| 11,503,806 B1 * | 11/2022 | Mullin | ............... | A46B 11/0041 |
| 2004/0216693 A1 * | 11/2004 | Handelsman | ........ | A01K 15/026 119/709 |
| 2005/0166865 A1 * | 8/2005 | Handelsman | ........ | A01K 15/026 119/709 |

(Continued)

FOREIGN PATENT DOCUMENTS

WO    WO-2018067550 A1 *    4/2018    ........... A01K 15/026

*Primary Examiner* — Trinh T Nguyen
(74) *Attorney, Agent, or Firm* — Bochner PLLC; Andrew D. Bochner

(57) ABSTRACT

A dental station for improving domestic animal dental care and oral hygiene, dental station having a body including a supporting structure which includes a plurality of receiving holding formations to receive and support one or more of a plurality of preselected sized and shaped chewable food elements in a protruding manner.

11 Claims, 12 Drawing Sheets

(56) References Cited

U.S. PATENT DOCUMENTS

| | | | |
|---|---|---|---|
| 2007/0015100 A1* | 1/2007 | Morris | A01K 15/026 433/1 |
| 2007/0044730 A1* | 3/2007 | Axelrod | A01K 15/026 119/709 |
| 2009/0025649 A1* | 1/2009 | Gamble | A01K 15/026 119/709 |
| 2011/0011351 A1* | 1/2011 | Simoni | A01K 15/026 119/709 |
| 2013/0074780 A1* | 3/2013 | Wechsler | A01K 15/026 119/710 |
| 2015/0020741 A1* | 1/2015 | Ressemann | A01K 13/001 119/61.5 |
| 2015/0334993 A1* | 11/2015 | Roetheli | A01K 15/025 426/512 |
| 2020/0196575 A1* | 6/2020 | Roetheli | A01K 15/025 |
| 2021/0022319 A1* | 1/2021 | Dertsakyan | A01K 15/026 |
| 2021/0059212 A1* | 3/2021 | Lentz | A01K 15/02 |
| 2021/0289749 A1* | 9/2021 | Lai | A01K 15/026 |
| 2022/0322635 A1* | 10/2022 | McCormick | A01K 5/0114 |

\* cited by examiner

DENTAL STATION AND SYSTEM FOR DOMESTIC ANIMAL DENTAL CARE

FIELD OF THE INVENTION

The present invention relates to a dental station for use in improving domestic animal dental care and oral hygiene.

In particular the present invention relates to a dental station and system for aiding maintaining oral hygiene of a domestic pet such as a dog or a cat, and which reduces onset of some form of periodontal disease that can otherwise lead to halitosis and pain.

The invention has been developed primarily for use in/with a dental station for improving oral hygiene of a domestic animal such as a dog or a cat and will be described hereinafter with reference to this application. However, it will be appreciated that the invention is not limited to this particular field of use.

BACKGROUND OF THE INVENTION

According to veterinary statistics, by three years of age, most dogs and cats have some evidence of periodontal disease. Periodontal disease in canines is a bacterial infection of the mouth usually progressing from plaque and mildly inflamed gums to established gingivitis, which may ultimately involve bone and/or tooth loss.

Periodontal disease (gum disease) is caused by bacterial infection that builds up in plaque which is made up of food particles and saliva. Plaque readily sticks to tooth surface above and below the gum line. If plaque is not removed, minerals in saliva will calcify the plaque into dental calculus (tartar) which firmly attaches to the teeth. Over time bacterial infection in tartar can spread under the gum line.

Bacteria in the sub-gingival plaque can cause irreversible changes to occur in the dentition including destruction of supportive tissues and bone, resulting in red gums, swollen gums, receding gums, bleeding gums, bad breath, loosening of teeth, loss of appetite and reluctance to eat. Bacteria under the gum line which if allowed to progress, can enter the blood stream and begin to move around the body causing inflammation in blood vessels, kidneys, heart and brain.

In recent years, veterinarians have become increasingly aware of the need for improved canine and feline dental care and regular brushing of a pet's teeth is recommended to prevent decay and gum disease. Many dental tooth brush varieties and dental pastes are available on the market, along with different designs and different formulations.

Many pet dental kits come with a microfibre finger cloth with which to start, and with toothpaste and a double headed toothbrush, specifically designed for your pet's mouth. Finger brushes can also be used.

However, it is often the case that pet owners and pets find the practice of brushing a pet's teeth distasteful and veterinary recommendations for frequent brushing is generally ignored to the detriment of the animals' teeth and gums.

Recognizing the need for improved canine dental care and the reluctance of pet owners to brush their animals' teeth, the pet industry has developed a wide variety of chew toys that provide a cleaning of the dog's teeth and a massaging of its gums. A popular chew toy for such purposes comprises a short length of cotton rope having large knots formed near the ends thereof to resemble a classic dog bone configuration. As the dog chews the toy, the soft cotton rope provides a cleaning and flossing of the dog's teeth however, cotton is not inherently attractive to dogs due to lack of texture.

A wide variety of rawhide chew toys, some of which have become very popular, have been developed to be more attractive to dogs. Rawhide is the hide of an animal, such as from cattle, pigs, buffalo, deer or elk, which has not been exposed to tanning. Rawhide has an inherent advantage over cotton in dog chew toys because of the attractiveness of its texture to dogs. Also, rawhide is more abrasive than cotton or rubber material from which chew toys are made, and arguably provides improved plague removal and superior cleaning of the animal's teeth when chewed. However, the rawhide chew toys to date do not provide the beneficial flossing effect of the cotton chew toys. In addition, it is known that domestic animals such as dogs and cats have predominant sides of their rear molars and premolars that they prefer to chew on. Accordingly it is usually the case that the particular preferred side for chewing will benefit from scraping effect of chewing and less plaque and tartar buildup, however the converse is that the non-preferred chewing side will not receive the same benefit. This is a clear disadvantage of conventional chew toys. Whatever side the animal prefers to chew on will leave one side more plaque and tartar buildup; this usually equates to approximately in most cases up to 40% cleaner on one side than the least preferred side to chew on. It would be an advantage to have a system or device that is able to assist cleaning both sides of the jaw more evenly and consistently.

Products such as Greenies™ and Dentabones™ encourage your pets to chew, which helps rub plaque off, and also spread protective saliva around teeth. However such products only offer benefits that focus on rear molars and premolars hence front of the teeth such as canines and incisors remain vulnerable target sites for plaque and tartar buildup and periodontal disease.

Feeding fresh raw bones and other animal products can greatly aid the hygiene of the mouth. Not every dog or cat can have bones and there are some animals that have medical conditions or gut sensitivities that prohibit the use of bones in the diet.

Recent years have seen the addition of effective therapeutic agents such as a dental cleansing agent or breath freshener to pet chew toys as well as an added attractant such as a flavoring or scent. While scents and flavorings have been added to rawhide chew toys, they are typically applied to and carried solely by the surface of the rawhide. Once the animal licks the flavoring from the toy, any future enticement to chew provided by the scent or flavoring is lost and the chew toy may be ignored. The same would be true of a therapeutic agent carried by the surface of the chew toy. The chew toy of the present invention not only utilizes the inherent attractiveness of the rawhide while providing the beneficial flossing found in many of the cotton toys, it can effectively carry and deliver one or more therapeutic agents and/or carry an added animal attractant.

In view of the above, it is desirable to have a dental device that addresses one or more of the prior art deficiencies.

It is to be understood that, if any prior art information is referred to herein, such reference does not constitute an admission that the information forms part of the common general knowledge in the art, in Australia or any other country.

SUMMARY OF INVENTION

According to a first aspect of the present invention, there is provided a dental station for improving domestic animal dental care and oral hygiene, the dental station including a supporting structure which includes a plurality of receiving holding formations to receive and support one or more of a plurality of preselected sized and shaped chewable food elements in a protruding manner.

The present invention represents an advance over prior art dental systems because the dental station provides a practical way of enabling and attracting a canine to chew food elements on both sides of the jaw to allow effective cleaning of teeth.

The supporting structure can include a structure which aids in tending the domestic animal to use the one or more of a plurality of preselected sized and shaped chewable food elements held in a protruding manner to encourage use of at least one set of particular teeth of the domestic animal.

Preferably the at least one set of particular teeth of the domestic animal includes at least one of: Canines; Incisors; Premolars; Molars. The ability to provide a system which encourages and facilitates cleaning of front teeth such as the canines and incisors is a particular advantage and represents an advance over the prior art chew toys and the like.

The dental station can have the supporting structure configured to define one or more shaped depots for tending a domestic animal into a particular orientation relative to at least part of one of the one or more shaped depots; a plurality of receiving holding formations located on the supporting structure of the least one of the one or more shaped depots, the holding formations adapted to receive and support one or more of a plurality of preselected sized and shaped chewable food elements in a protruding manner; wherein, in use, the chewable food elements extend into the at least one or more of the shaped depots from a predefined direction and height to be accessible by particular teeth of the domestic animal.

Preferably the supporting structure includes shaped walls configured to define one or more depots for a domestic animal; a plurality of receiving holding formations located on the shaped walls, the holding formations adapted to receive and support one or more of a plurality of preselected sized and shaped chewable food elements in a protruding manner wherein the chewable food elements extend into the one or more depots from a desired direction and height within the depot to both encourage approach by a domestic animal and use of teeth on either side of the animal's mouth.

The dental station according to the present invention does not give a dog or cat an option to chew on a preferred side. It achieves this by locating the chewable food elements in such a way that there is only one option of which teeth are used to access the chews, i.e., the location of the chewable food elements relative to the depots encourages orientation and alignment of the dog or cat to eat the chew from a preselect side where both sides have exactly the same amount of chewing action on both side of its rear molars and premolar resulting in both side being equally cleaned.

Preferably the supporting structure including at least one of the plurality of receiving holding formations is able to receive and hold one or more of a plurality of preselected sized and shaped chewable food elements in a protruding manner to encourage use of particular teeth of the domestic animal.

The supporting structure can include shaped walls including or adjacent to at least one of the plurality of receiving holding formations wherein the shaped walls aids in tending the domestic animal to approach the one or more of a plurality of preselected sized and shaped chewable food elements held in a protruding manner from a particular direction to encourage use of particular teeth of the domestic animal including front teeth such as canines and incisors.

The supporting structure can include shaped floors including or adjacent to at least one of the plurality of receiving holding formations wherein the shaped walls aids in tending the domestic animal to approach the one or more of a plurality of preselected sized and shaped chewable food elements held in a protruding manner from a particular direction to encourage use of particular teeth of the domestic animal.

Preferably the plurality of receiving holding formations are formed to receive and hold a plurality of preselected sized and shaped chewable food elements in a protruding manner.

The plurality of receiving holding formations of the dental station are preferably supported by the supporting structure at a particular predefined height wherein the height location tends the domestic animal to approach the one or more of a plurality of preselected sized and shaped chewable food elements held to encourage use of particular teeth of the domestic animal. This is an advantage for the cleaning and maintaining of clean front teeth such as canines and incisors which is a departure from and advance over the prior art.

The plurality of preselected sized and shaped chewable food elements is preferably held proud of a supporting structure wall.

The plurality of preselected sized and shaped chewable food elements is preferably held proud of a supporting floor.

Preferably the plurality of preselected sized and shaped chewable food elements is held proud of a supporting structure wall adjacent at least one protruding teeth engaging formations wherein as the domestic animal chews the one or more of a plurality of preselected sized and shaped chewable food elements the protruding teeth engaging formation engage the teeth of the domestic animal in a cleaning manner.

The at least one protruding teeth engaging formations can be resiliently flexible.

Preferably the at least one protruding teeth engaging formations are tentacle formations.

In one aspect of the present invention, the supporting structure can include a plurality of depots with different ones of the plurality of receiving holding formations to receive and support one or more of a plurality of preselected sized and shaped chewable food elements in a protruding manner wherein the domestic animal can progress from station to station to achieve cleaning of different sets of particular teeth of the domestic animal.

The plurality of depots can be formed by the supporting structure in a radiating arrangement from a central point.

Preferably the central point forms a fixing point by a fixing means able to be received and extend through the support and connect to the support.

In a related aspect of the present invention there is disclosed a dental station for improving domestic animal dental care and oral hygiene, the dental station having a supporting structure which includes: at least one shaped wall and a shaped floor; a plurality of receiving holding formations supported on or adjacent the shaped walls and/or shaped floor by the supporting structure to receive and support one or more of a plurality of preselected sized and shaped chewable food elements in a protruding manner; wherein the supporting structure allows for positioning of the one or more of a plurality of preselected sized and shaped chewable food elements in a protruding manner in at least one of: location; height above base; wherein the form of the dental structure aids in tending the domestic animal to use the one or more of a plurality of preselected sized and shaped chewable food elements held in a protruding manner to encourage use of at least one set of particular teeth of the domestic animal including at least one of: Canines; Incisors;

Premolars; Molars. In particular, the ability to provide a system which encourages and facilitates cleaning of front teeth such as the canines and incisors is a particular advantage and represents an advance over the prior art chew toys and the like.

The supporting structure preferably includes shaped walls including or adjacent to at least one of the plurality of receiving holding formations wherein the shaped walls aids in tending the domestic animal to approach the one or more of a plurality of preselected sized and shaped chewable food elements held in a protruding manner from a particular direction to encourage use of particular teeth of the domestic animal.

The supporting structure can include shaped floors including or adjacent to at least one of the plurality of receiving holding formations wherein the shaped walls aids in tending the domestic animal to approach the one or more of a plurality of preselected sized and shaped chewable food elements held in a protruding manner from a particular direction to encourage use of particular teeth of the domestic animal.

Preferably the plurality of receiving holding formations are formed to receive and hold a plurality of preselected sized and shaped chewable food elements in a protruding manner.

The plurality of receiving holding formations are preferably supported by the supporting structure at a particular predefined height wherein the height location tends the domestic animal to approach the one or more of a plurality of preselected sized and shaped chewable food elements held to encourage use of particular teeth of the domestic animal.

The plurality of preselected sized and shaped chewable food elements is preferably held proud of a supporting structure wall.

The plurality of preselected sized and shaped chewable food elements is preferably held proud of a supporting floor.

The plurality of preselected sized and shaped chewable food elements is preferably held proud of a supporting structure wall adjacent at least one protruding teeth engaging formations wherein as the domestic animal chews the one or more of a plurality of preselected sized and shaped chewable food elements the protruding teeth engaging formation engage the teeth of the domestic animal in a cleaning manner.

Preferably at least one protruding teeth engaging formations are resiliently flexible.

The at least one protruding teeth engaging formations can be tentacle formations.

Preferably the supporting structure has a plurality of depots with different ones of the plurality of receiving holding formations to receive and support one or more of a plurality of preselected sized and shaped chewable food elements in a protruding manner wherein the domestic animal can progress from station to station to achieve cleaning of different sets of particular teeth of the domestic animal.

The plurality of depots can be formed by the supporting structure in a radiating arrangement from a central point.

Preferably the central point forms a fixing point by a fixing means able to be received and extend through the support and connect to the support.

In a further related aspect of the present invention there is disclosed A system for domestic animal dental care including the steps of: a. providing a plurality of preselected sized and shaped chewable food elements; b. providing a supporting structure for supporting the plurality of preselected sized and shaped chewable food element; wherein the supporting structure allows for positioning of the one or more of a plurality of preselected sized and shaped chewable food elements in a protruding manner in at least one of: i. location, ii. height above base, iii. Angle; wherein the form of the supporting structure aids in tending the domestic animal to use the one or more of a plurality of preselected sized and shaped chewable food elements held in a protruding manner to encourage use of at least one set of particular teeth of the domestic animal including at least one of: i. Canines, ii. Incisors, iii. Premolars, iv. Molars.

In a further related aspect of the present invention there is described a depot for tending a domestic animal into a particular orientation to clean the animal's teeth including: a support structure having: a floor section, a perimeter wall portion, and a front recessed or shallow wall relative to the perimeter wall portion to allow access to the floor section for a domestic animal in a forward or front on position, wherein the perimeter wall further includes oppositely disposed holding receiving formations adapted to receive and hold a preselected shaped sized chew food element extending at an angle to the perimeter wall portion for chewing on rear right and left of the animal's teeth; a frame plate sized and shaped to fit the floor of the support structure, the frame plate having: a frame part surrounding a window opening, the window opening adapted to receive a shaped sized chewable food block therethrough, wherein an underneath portion of the frame part includes a recess perimeter about the window opening, and a locking opening in the frame part for receiving a locking knob to releasably retain the frame plate to the floor; a shaped chewable food block including: a base having a shape substantially corresponding to the window opening, and protruding food elements extending from the base through the window in an assembled condition, and a series of flange elements extending from edges of the base adapted fit within and about the recess perimeter; complimentary releasable locking means on the support structure and the frame plate to retain the shaped chewable food block substantially in a sandwiched position in the depot between the frame plate and the floor for consumption by the animal; wherein the relative orientation of the front recessed shallow wall and the shaped chewable food block urges the domestic animal to face forward toward the shaped chewable food block when in the depot and thereby influence chewing of the protruding food elements using its front teeth.

The complimentary releasable locking means can include a longitudinal opening in the floor adjacent the recessed or shallow wall, and a locking knob having a shaped locking tab wherein the locking tab is releasably engageable with the longitudinal opening.

Preferably the complimentary releasable locking means further includes a tab extending from the frame part of the frame plate away from the longitudinal opening, and a recess opening between the floor of the support structure and perimeter wall distal to the shallow wall, wherein the tab is adapted to be received in a releasably locking position in the recess opening in an assembled condition.

Preferably, in an assembled condition the frame plate is positioned over the shaped chewable food block so that flange elements thereof are received by the recess perimeter of the frame plate, and tab member is slidably received in the recess opening.

The depot can further include: a substantially non-slip rubber matt underneath the floor which increases friction with a supporting surface, and an access port with plug in the rear of the floor for allowing pouring in of fluid material such as sand or water for added stability.

In a further related aspect there is described a depot for improving domestic animal dental care and oral hygiene including: a support structure having: a floor section, a perimeter wall portion, and a front recessed or shallow wall relative to the perimeter wall portion to allow access to the floor section for a domestic animal in a forward or front on position, wherein the perimeter wall further includes oppositely disposed holding receiving formations adapted to receive and hold a preselected shaped sized chew food element extending at an angle to the perimeter wall portion for chewing on rear right and left of the animal's teeth; a brush plate sized and shaped to fit within the floor section of the support structure, the brush plate having a plurality of substantially upright brush members forming a brush field for removing plaque and tartar and a series of spaced apart insertion ports for receiving a shaped and sized chewable food element interspersed with the brush field; a holding means beneath the brush plate for securing the shaped and sized chewable food elements in the insertion position; and a releasable locking means for securing the brush plate to the floor of the support structure.

The holding means can be located on the floor section of the support structure. Preferably the depot further includes a support plate intermediate the floor section of the support structure and the brush plate, the support plate having a series of openings corresponding with insertion openings in the brush plate, forming the holding means for receiving and holding the chewable food elements interspersed within the brush field. The support plate adds stability to the depot by locating the brush plate, minimizing movement of the brush plate as the chew elements are being sought and subject to chewing by an animal, and providing an anchor with the support structure. In addition, the support plate protects the support structure from damage by an animal and can be used multiple times.

Preferably the support plate includes a molded rubber central portion and a plastic frame border, the rubber central portion having a plurality of malleable/flexible openings forming a holding means adapted to receive and locate preselected sized and shaped chewable food elements. The molded rubber central portion allows the chew element to be received by enlargement as an insertion end of the food element is inserted and thereafter elastically forming a closure about the insertion end. The plastic frame border is relatively more rigid than the rubber centre portion and in one embodiment can slidable engage with a recess opening in a perimeter wall section for anchoring the support plate to the support structure.

The support plate can further include a locking opening in a forward portion of the plastic border coinciding with locking opening of the brush plate for receiving a locking tab on a locking knob.

The depot can further include a complimentary engagement means on the support plate and a portion of the perimeter wall to retain the support plate in a stable position in use.

The complimentary engagement means can include a flange extending from a portion of the plastic border of the support plate and a recess opening in the perimeter wall wherein the flange is adapted to releasably and slidably engage with the recess opening.

The support plate can further include a series of spaced apart rib members adding structural strength to the central portion.

Benefits of the system include one or more of:
a. Encourages domestic animal like canine to graze on shaped chewable food elements on both sides of oral cavity;
b. Different chews and locations help to cleans all teeth, i.e., anterior and posterior teeth and all surfaces;
c. Physical hindrance created by the configuration of the dental station orients an animal to left and right chewing and inside and outside surfaces of tooth cleaning;
d. The ability to provide a system which encourages and facilitates cleaning of front teeth such as the canines and incisors is a particular advantage and represents an advance over the prior art chew toys and the like.
e. The dental station can accommodate a plurality of animals at the same time Other aspects of the invention are also disclosed with reference to accompanying drawings and examples.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF PREFERRED EMBODIMENTS

Figure 1:
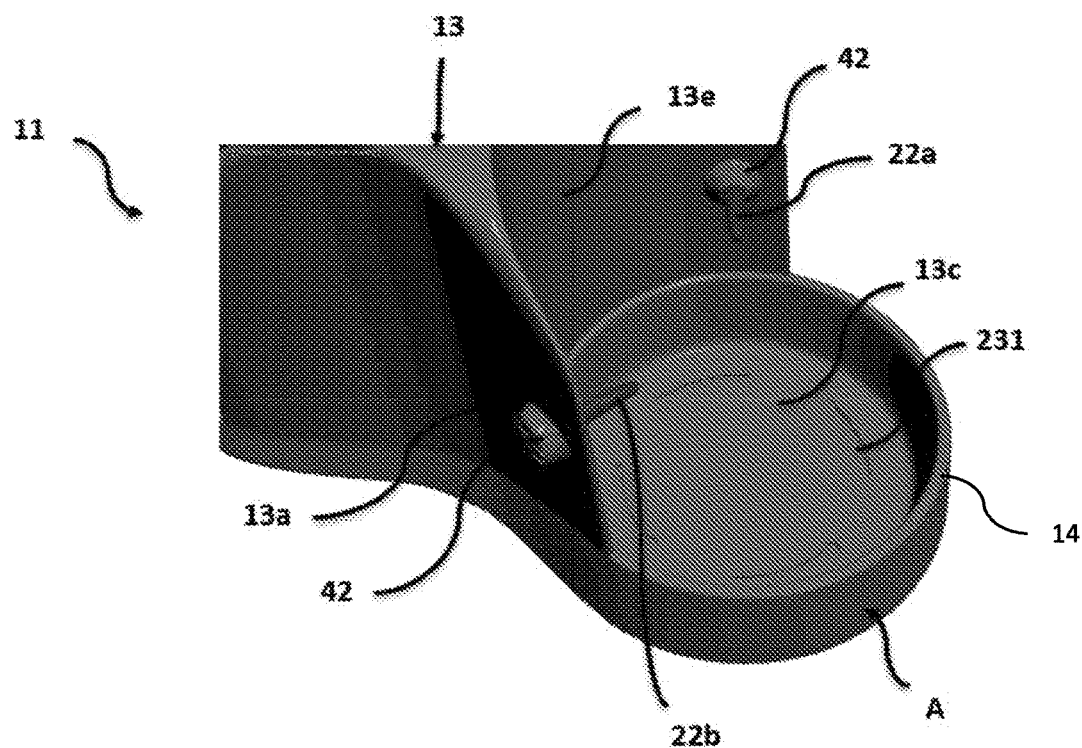
FIG. 1 is a schematic close-up view of a dental station and system for domestic animal dental care in accordance with a first embodiment of the present invention.

It should be noted in the following description that like or the same reference numerals in different embodiments denote the same or similar features.

Referring to the drawings there is shown a dental station 11 for improving domestic animal dental care and oral hygiene. As shown broadly in reference to FIG. 1, the dental station 11 in one embodiment includes a supporting structure 13, which includes a plurality of receiving holding formations 42 to receive and support one or more of a plurality of preselected sized and shaped chewable food elements 22a and 22b in a protruding manner. The location and shape of the chewable food elements in the holding formations provide for effective cleaning of an animal's teeth (see FIG. 13) on both sides of the upper and lower teeth, front and internal surfaces.

As shown, the supporting structure 13 is configured to define one or more shaped depots 200 and 201 for tending a domestic animal into a particular orientation relative to at least part of one of the one or more shaped depots. In the one or more depots there is shown a plurality of receiving holding formations located on the supporting structure 13 of the least one of the one or more shaped depots. The holding formations are adapted to receive and support one or more of a plurality of preselected sized and shaped chewable food elements 21, 22a or 22b in a protruding manner into a depot. In use, the chewable food elements extend into the at least one or more of the shaped depots from a predefined direction and height to be accessible by particular teeth of the domestic animal.

As show in the figures, the supporting structure 13 includes shaped walls configured to define the one or more depots for a domestic animal. There is shown a plurality of receiving holding formations 42 and 43 located on the shaped walls of the support structure and the holding formations are adapted to receive and support one or more of the plurality of preselected sized and shaped chewable food elements in a protruding manner. The chewable food elements extend into the one or more depots from a desired direction and height within the depot to both encourage approach by a domestic animal and use of teeth on either side of the animal's mouth.

Figure 7:
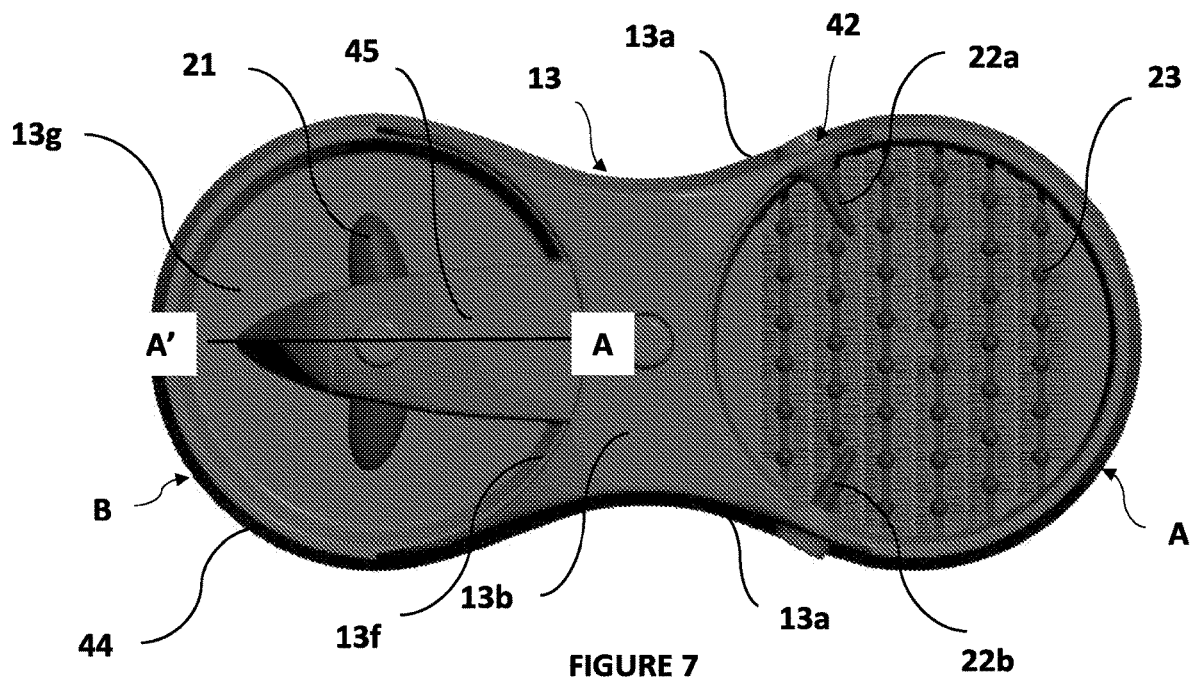
FIG. 7 is a schematic representation of the dental station of FIG. 5 in overhead plan view.

As shown in FIGS. 1 and 7, the supporting structure 13 comprises opposite shaped external walls 13a and internal shaped wall 13e extending therebetween, the walls 13a being adjacent to the holding receiving formations 42. In the embodiment shown in FIG. 1 the combined shaped walls and holding receiving formations 42, located adjacent thereto, are adapted to receive and hold a preselected shaped and sized chewable food element 22a and 22b in a protruding manner from a desired direction to both encourage approach by a domestic animal and use of teeth on either side of the animal's mouth.

The holding formations 42 include a releasable engagement structure for holding the chewable food element in a protruding condition comprising a mounting portion 33 in walls 13a having an internal screw thread and a mating holding pin 34 releasably engageable in the mounting portion. As shown in the figures, the pin includes a head having a recess for receiving a screwdriver or like for fastening or disengaging and releasing the holding pin from the mounting portion so that a chewable food element can be received and replaced once exhausted.

In FIG. 1, the support structure 13 shows shaped walls 13a are arcuate and shaped internal wall 13e is concave, wherein the shaped walls 13a and shaped internal wall 13e form a depot A. The depot A can further include a shaped floor section 13c, which floor section is substantially circular and bounded by a perimeter wall 14 at least a portion of which is received within or integral with the concave wall 13e and on which portions of the shaped walls 13a of the support structure is mounted.

Figure 2:
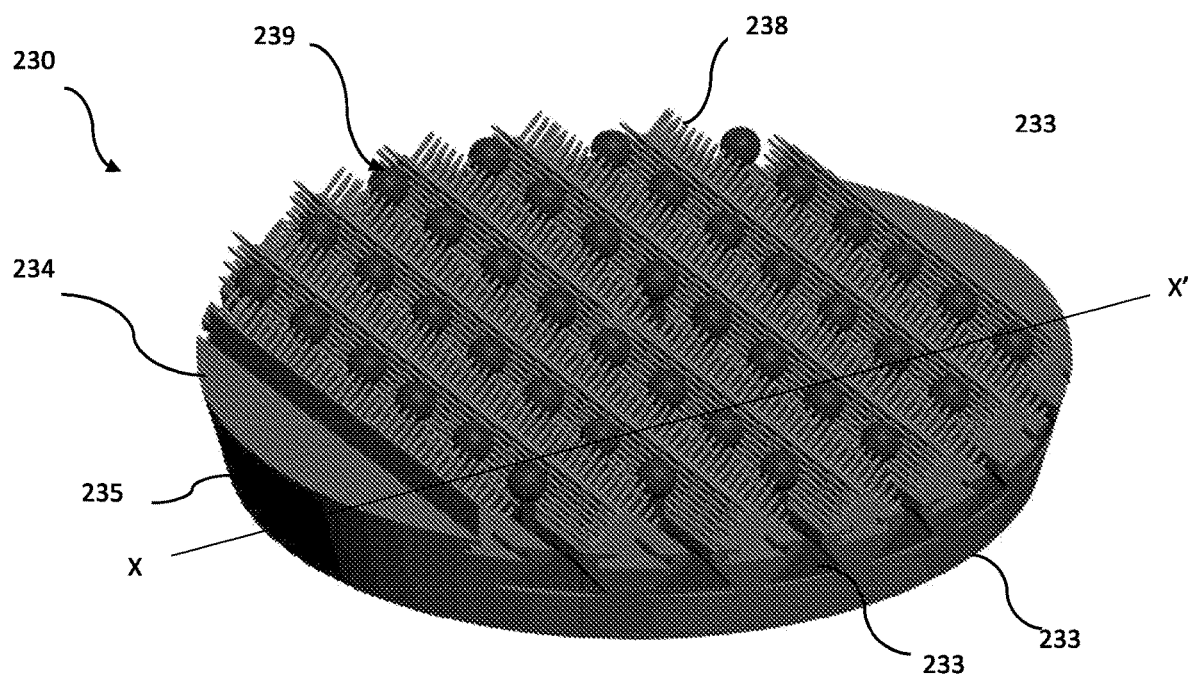
FIG. 2 is a schematic close-up view of an insert structure for use with the dental station shown in FIG. 1.
Figure 14:
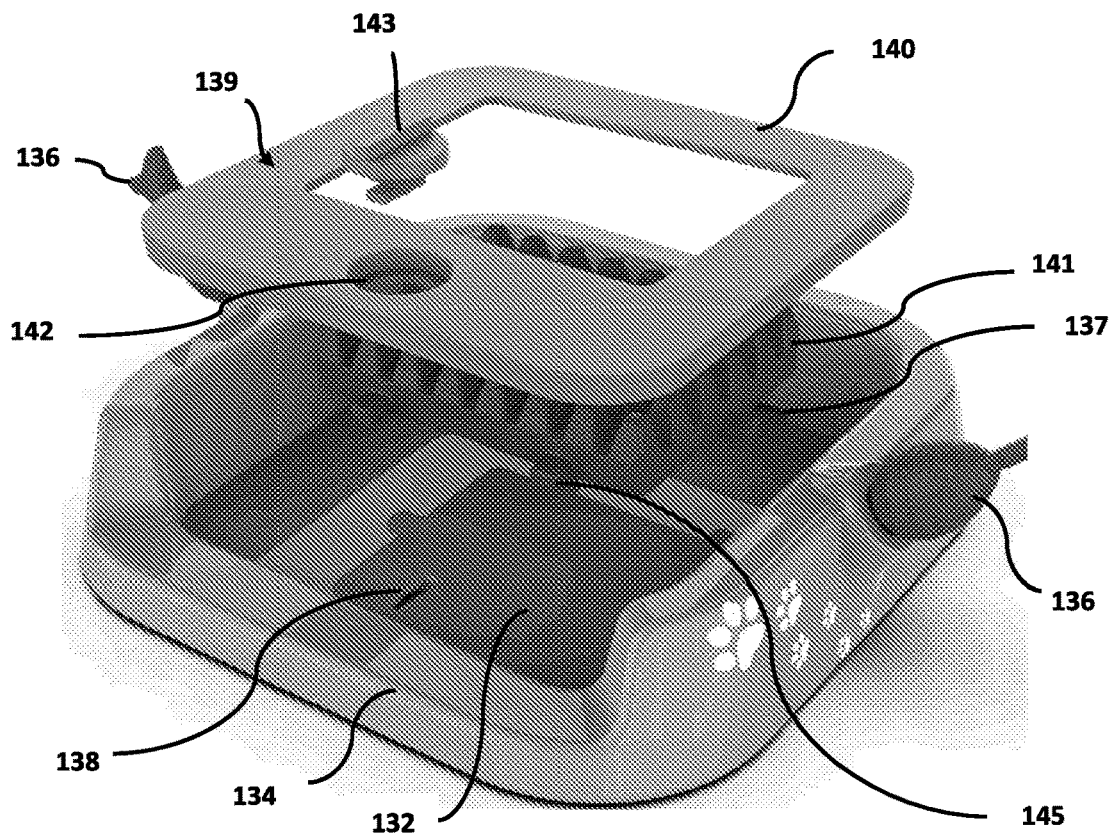
FIG. 14 is a schematic exploded view of the dental station and system for domestic animal dental care in FIGS. 11 and 12.

By the combination of various holding formations and shaped walls of the support structure, an animal is hindered sufficiently such that, for example, a first shaped chew 22a is accessible only on the right side of the animal's oral cavity allowing cleaning of teeth on the right (refer FIG. 2). Similarly, second shaped chew 22b protruding from the second holding receiving formation 42 in the shaped wall 13a offers sufficient hindrance to approach by an animal such that the protruding chewable food product is accessible only on the left side of the animal's oral cavity allowing cleaning of teeth on the left upper and lower teeth (canine teeth can be best seen in FIG. 14).

Figure 3:
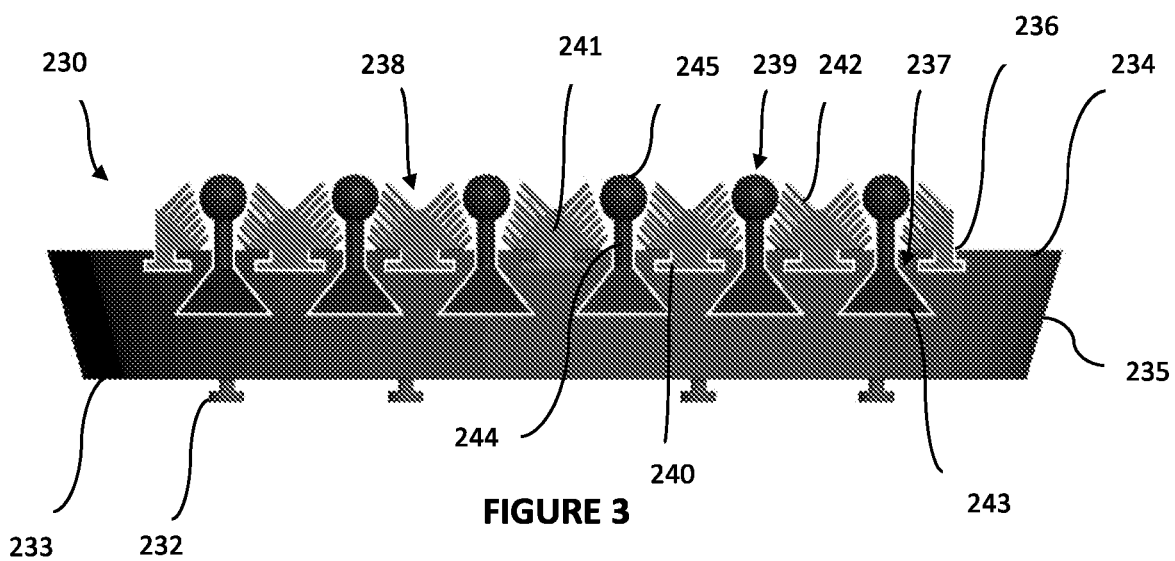
FIG. 3 is a schematic cross-sectional view of the insert structure across X-X' shown in FIG. 2.
Figure 4:
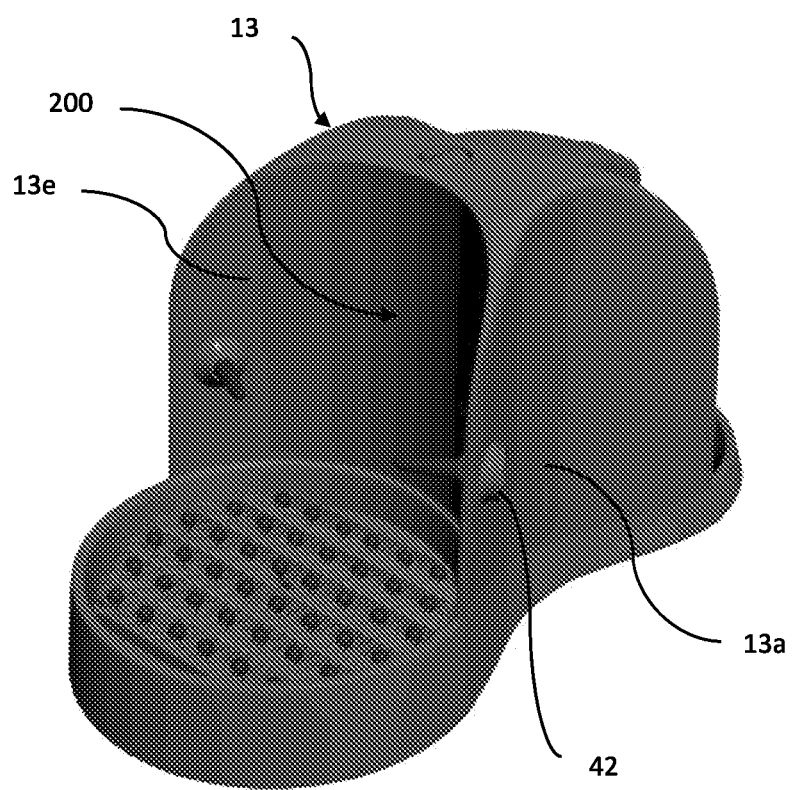
FIG. 4 is a schematic representation of a dental station and system for domestic animal dental care in part side and part end view in accordance with a further embodiment of the invention showing insert structure of FIG. 2 in assembled condition.
Figure 5:
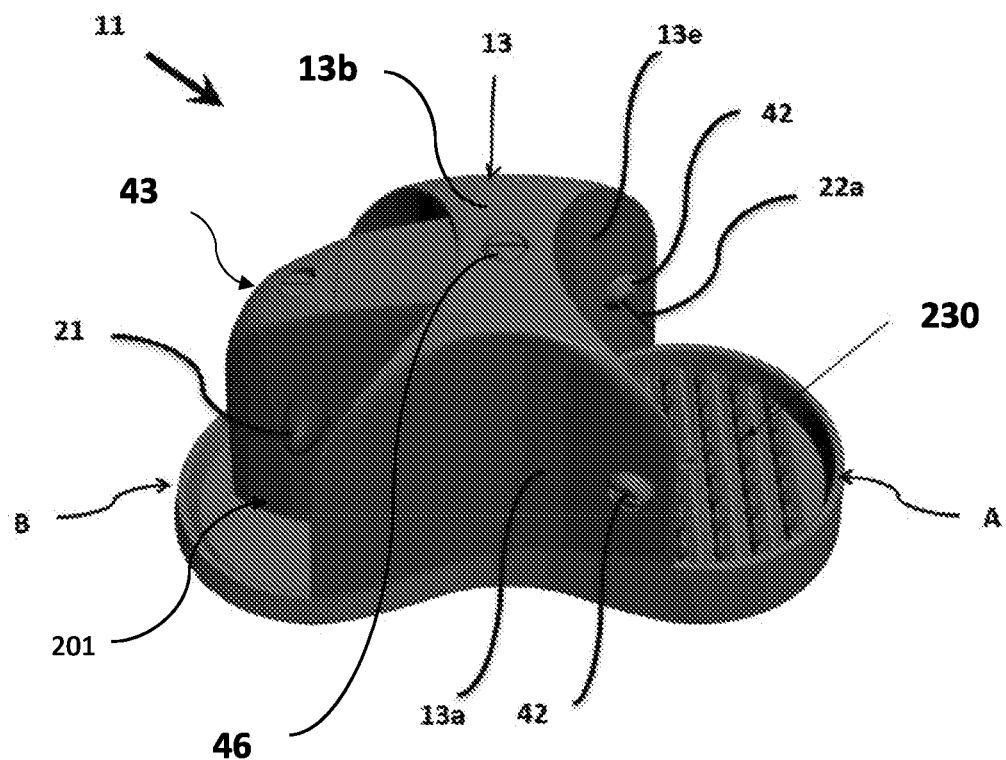
FIG. 5 is a schematic representation of a dental station and system for domestic animal dental care from an angled side view in accordance with a preferred embodiment of the present invention.
Figure 6:
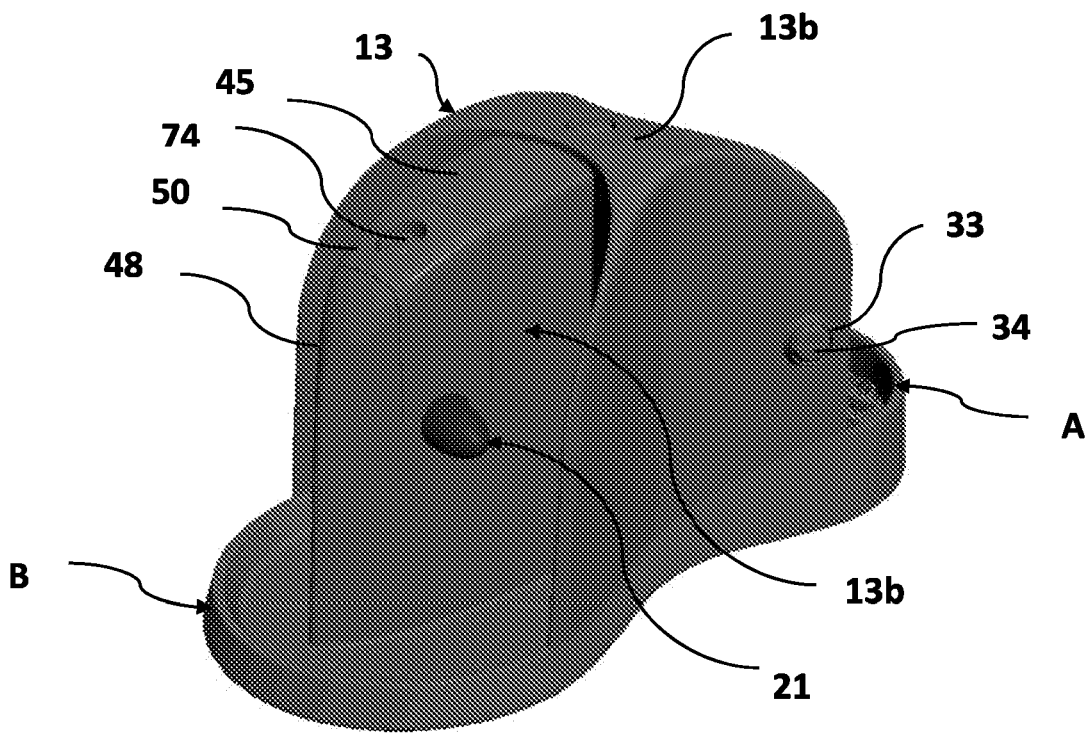
FIG. 6 is a schematic representation of the dental station of FIG. 5 in part side and part end view.

In FIGS. 2 and 3, the dental station further includes a chewable food and cleaning insert structure 230 adapted to be located in depot A. The chewable food and cleaning insert structure 230 includes a bottom platform 233 and a top portion 234 separated by a chamfered edge 235, the insert having a complementary shape with the depot A to conform with confines therein. In this embodiment, the shaped floor section of depot A and the insert 230 include mating engagement means to releasably locate the insert structure on the floor 13c within the depot A so that the insert structure is stably held while an animal grazes.

With particular reference to FIGS. 1 to 3, the mating engagement means comprise a plurality of flange elements 232 located beneath the bottom platform 233 of the insert 230, and a series of spaced apart arcuate recesses 231 in the floor section 13c of the depot A. The flanges 232 have an inverted T-configuration shaped to slidably engage with the spaced apart arcuate recesses 231 to releasably secure the insert structure 230 to the floor section 13c of depot A.

The insert 230 further includes a series of spaced apart longitudinal alternating teeth brushing holding formations 236 and chewable food element holding formations 237 extending across the top portion 234. The alternating holding formations 236 and 237 are configured to receive complimentary alternating teeth brushing structures 238 and chewable food elements 239 respectively.

In FIGS. 2 and 3, the teeth brushing holding formations 236 include a shallow inverse T-shape recess within the top portion 234 for receiving a longitudinal teeth brushing structure 238 laterally from the peripheral edge and in slidable engagement therethrough. The teeth brushing structures 238 include an inverse T-shape base insert 240, a shaped head portion 241 and brush elements 242 mounted on or attached to the shaped head portion, whereby the brush elements are arranged to extend at an angle from the head portion 241 and between and adjacent to the chewable food elements 239.

In the embodiment shown in FIG. 3 the shaped head portion 241 of the teeth brushing structures is substantially triangular with angled side portions forming in the main an arrow head structure having symmetrical angled side portions on which the brush elements 242 are mounted so that the brush elements 242 extend substantially perpendicular to the respective angled sides of the arrow head, and between rows of the chewable food elements 239.

The insert structure 230 further includes chewable food element holding formations 237 for receiving chewable food elements 239 laterally from the peripheral edge in slidable engagement therethrough. The chewable food element holding formations 237 include a relatively deep frusto-conical base recess extending from the top portion 234 within the insert structure, and a contiguous narrow slotted opening in the top surface 234, the holding formations extending across the insert 230 and alternating with the teeth brushing holding formations. The chewable food elements 239 include a shaped base 243 having a complementary shape to the frusto-conical base recess, a neck portion extending upwardly from the shaped base extending through the slotted opening, ending in a spherical head 245. The location of the chewable food elements 22a and 22b at a height H1 above the level of the insert 230 provides an arrangement to assist cleaning of all teeth surfaces of an animal such as a canine. The arrangement of the insert structure 230 also represents a significant benefit because the head portion of the chewable food elements combined with the teeth brushing structures 238, encourages an animal to continue chewing and promotes cleaning of different teeth and tooth surfaces and gums to the chewable food elements 22a and 22b.

Now referring to FIGS. 5 to 8, a further embodiment is shown in which the dental station 11 includes a support structure 13, and a plurality of holding receiving formations 42 and 43 to receive and support one or more of a plurality of preselected sized and shaped chewable food elements 22a, 22b and 21 in a protruding manner.

In FIGS. 5 to 8, the support structure 13 of the dental station 11 includes a pair of opposite shaped walls 13a interconnected by a body portion 13b, the body portion having opposing concave walls 13e and 13f extending transverse to and interconnecting the opposite walls 13a. The shaped walls 13a and concave wall 13f form a depot B in the station 11 spaced from and oppositely disposed to depot A.

The depot B can further include a shaped floor section 13g, which floor section is substantially circular and bounded by perimeter wall 44 at least a portion of which is received within or integral with the concave wall 13g and on which portions of the shaped walls 13a of the support structure is mounted.

The depot B can further include a shaped floor section 13g which is substantially circular and bounded by perimeter wall 44 at least a portion of which is received within the concave wall 13f and on which portions of the shaped walls 13a of the support structure is mounted.

In this embodiment, the shaped walls 13a and body 13b are configured to accommodate a plurality of depots. As shown, depot A and depot B in this embodiment are spaced and oppositely disposed, and each attached to opposing concave wall surfaces 13e and 13f of the body 13b. The plurality of depots in the station allows for use by multiple animals at the same time.

In this embodiment the dental station 11 further includes a holding receiving formation 43 mounted to a portion of the body 13b of support structure 13 and extends into the floor section of depot B. The holding receiving formation 43 includes a torso 45 shaped to locate within the confines of concave wall 13f, a nose 48 and a holding sub-assembly 43a, intermediate the torso 45 and nose 48, comprising a chewable food element holding receptacle 49 and a closure 50.

The holding receiving formation 43 and body 13b comprise mating engagement means including a threaded pin 47 on a portion of the torso 45 and a mating nut 46 extending through an opening in body 13b. In attaching the torso to the body, the holding receiving formation 43 is slidably inserted across the floor 13 section 13g and located beneath the body 13b within concave wall 13f.

Figure 9:
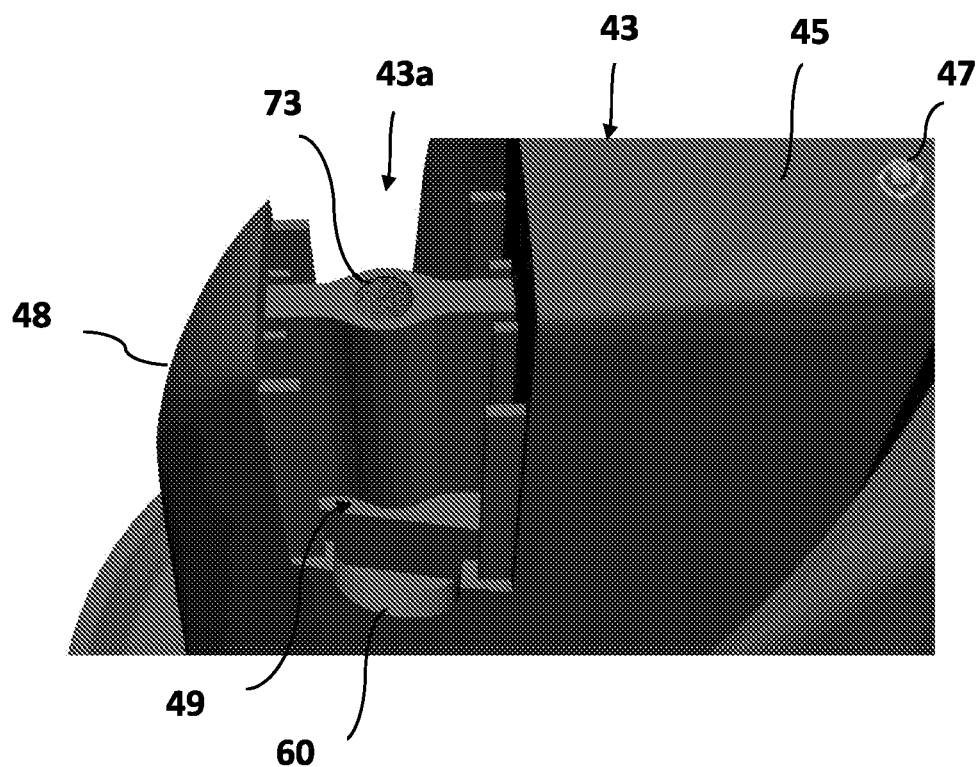
FIG. 9 is a schematic representation in part side elevation of the dental station of FIG. 1 showing internal system for receiving and holding a dog chew.
Figure 10:
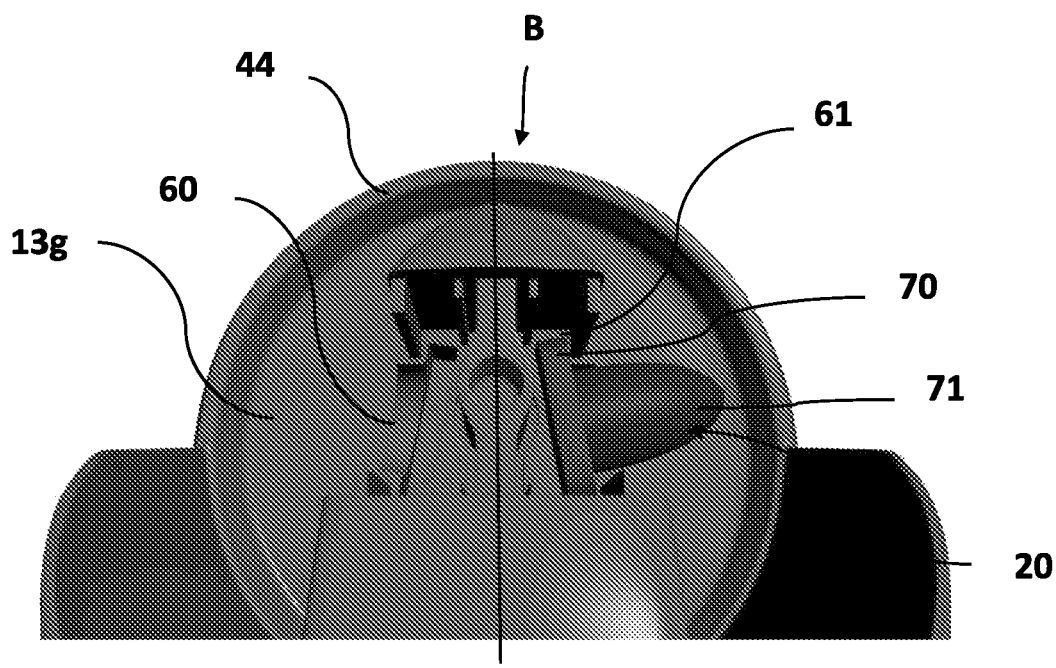
FIG. 10 is a schematic representation in a plan view of the dental station of FIG. 7 showing insertion of a dog chew in an insertion condition.
Figure 11:
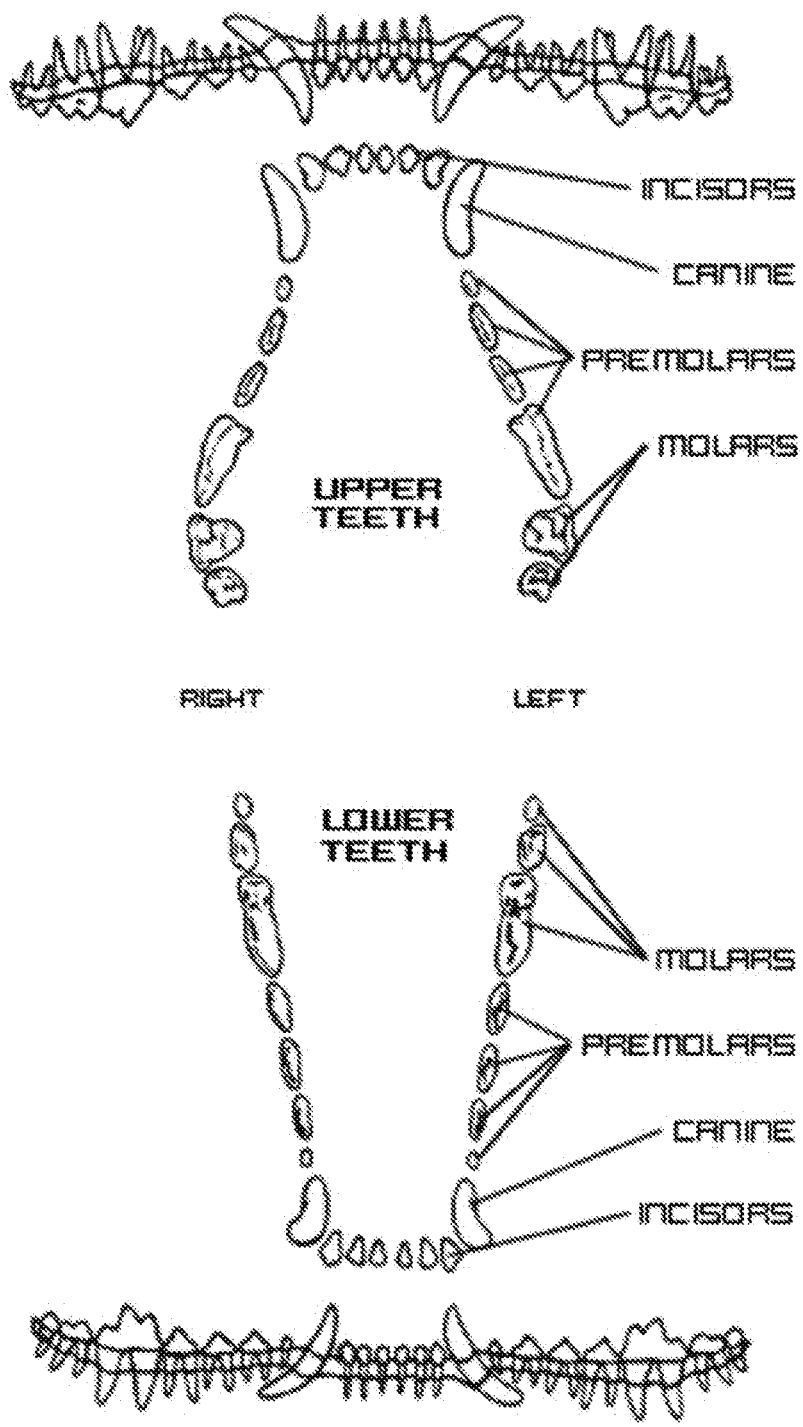
FIG. 11 is a schematic representation of the teeth of a domestic canine for treatment with the dental station of FIG. 1.
Figure 12:
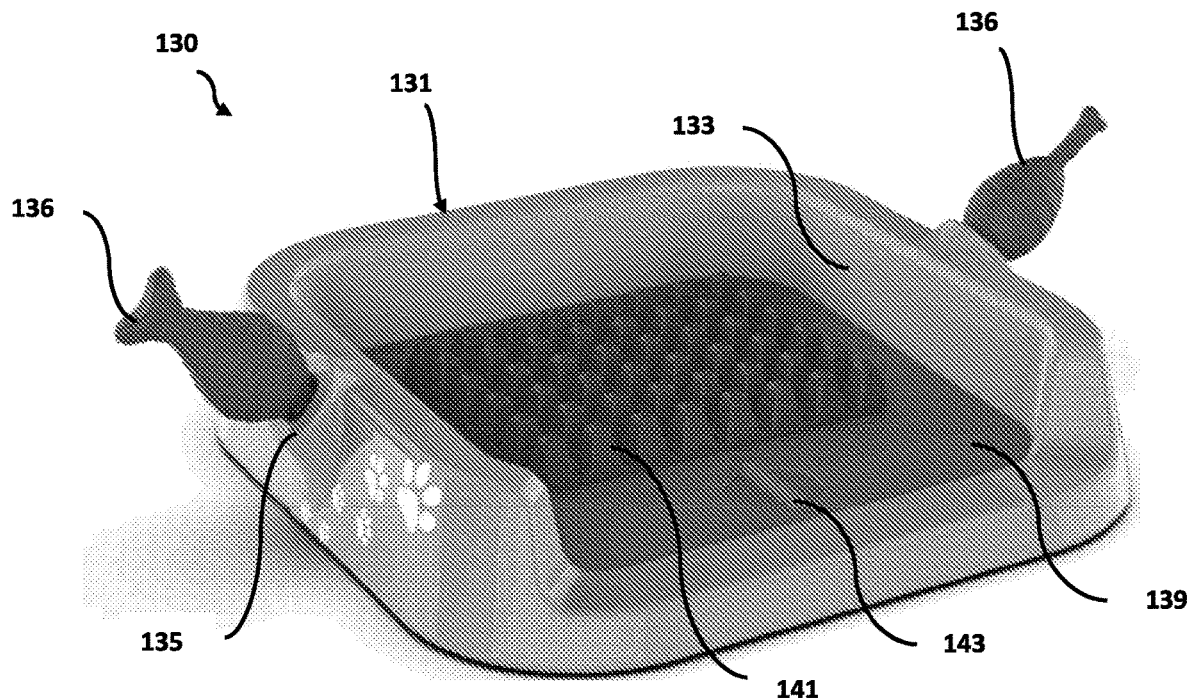
FIG. 12 is a schematic view of a dental station and system for domestic animal dental care in part side elevation in accordance with an alternative embodiment of the present invention.

As shown in FIGS. 9 and 10 with closure 50 removed, the chewable food element holding receptacle 49 of the holding sub-assembly 43a includes dual chewable food element mounts 60 and 61 for receiving at least a portion of a shaped chewable food element 20 and 21 respectively therein.

As shown in FIG. 10, the chewable food element mounts 60 and 61 are oppositely and symmetrically disposed at an angle relative to a centre line A-A' extending through the holding receiving formation 43.

It can be seen that shaped chewable food element 20 and 21 comprise a base portion 71 shaped to locate within respective mount 60 and 61, and a bullet-shaped head protruding into the floor section of depot B at an angle to the centerline A-A' at a height H1 above the floor of depot B.

Holding sub-assembly 43a includes a releasable engagement means on the chewable food element holding receptacle 49 and closure 50. As shown in FIGS. 9 and 10 the releasable engagement means comprises a slot 73 in the chewable food element holding receptacle 49 and a mating pin 74 adapted to pass through an opening in the closure aligned with the slot 73. The slot can include an internal screw thread and pin 74 a mating threaded section for releasably engaging therein. As shown in the figures, the pin 74 includes a recess for receiving a screwdriver or like for fastening or disengaging and releasing the holding pin from the mounting portion so that the closure can be opened and a chewable food element can be received and replaced once the bullet head is exhausted.

In FIGS. 5 to 8, closure 50 of the holding sub-assembly 43a is shown positioned over the chewable food element holding receptacle 49. Closure 50 includes an internal structure (not shown) which cooperates with mounts 60 and 61 such that when in a closed location (shown in FIGS. 5 to 8) the base portion 71 of the chewable food element 21 is enclosed providing a stable support for grazing of the bullet head by an animal.

Figure 8:
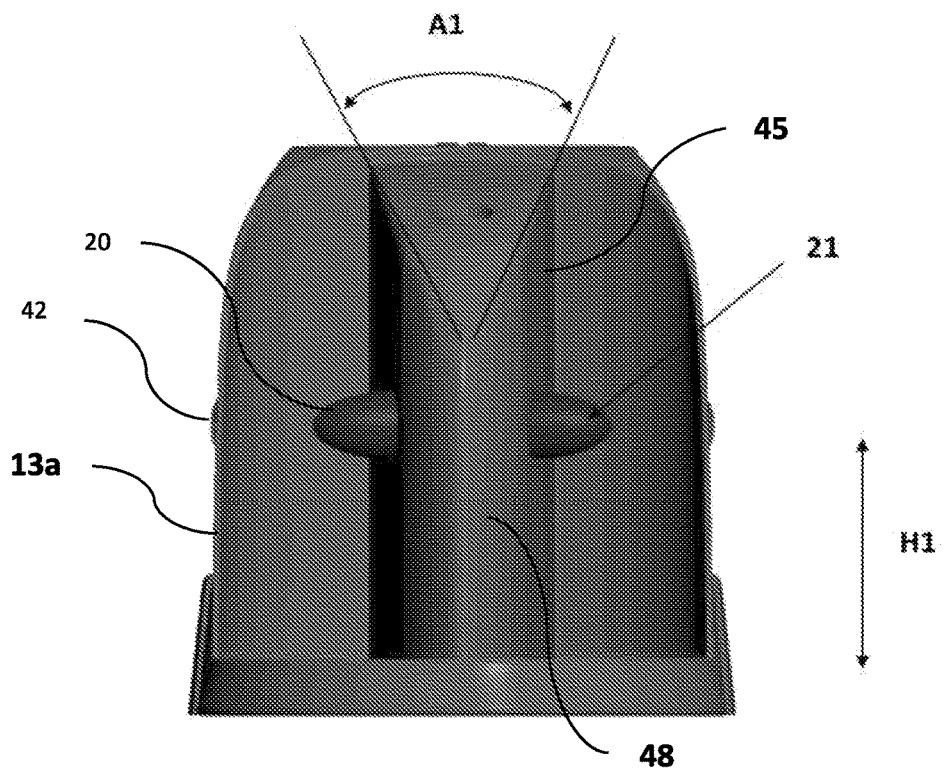
FIG. 8 is a schematic representation of the dental station of FIG. 5 showing opposite end of FIG. 4.

As shown in FIGS. 7 and 8, the holding receiving formation 43 provides a structure having an angle A1 between the torso and nose which is designed to partition the depot B, and in conjunction with the chewable food elements 20 and 21 and opposite walls 13a provide effective hindrance to a grazing animal that chewable food elements 20 and 21 can only be grazed on one side of the animal's oral cavity.

Figure 21:
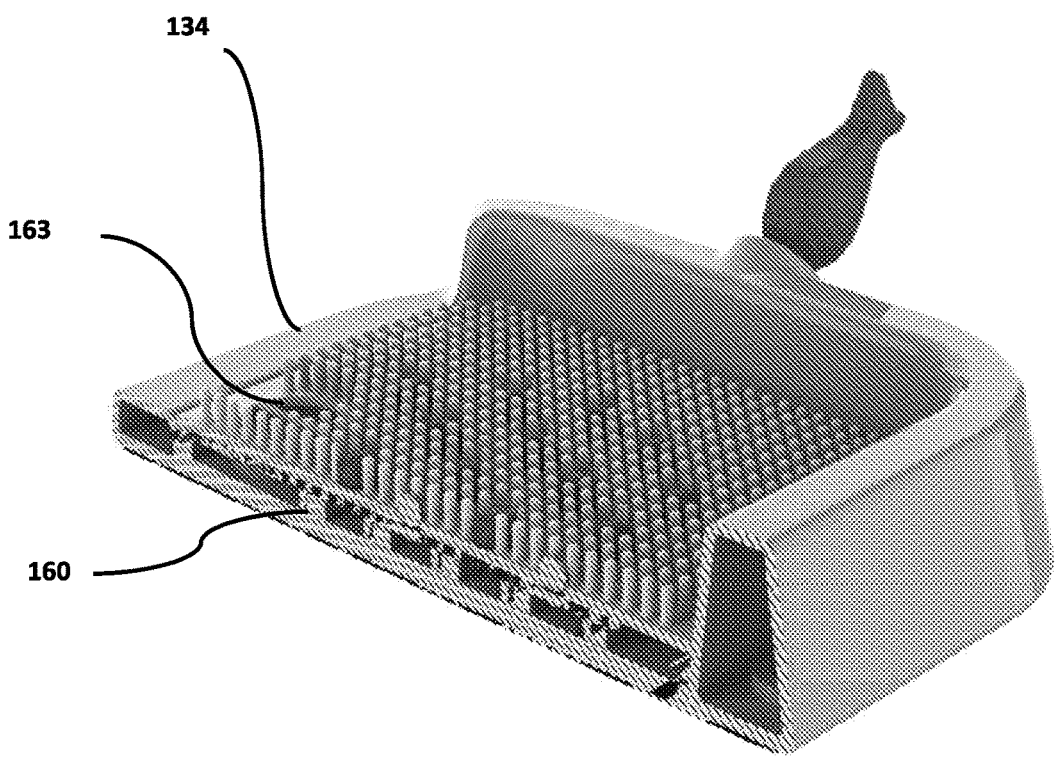
FIG. 21 is a schematic vertical cross-sectional view of the dental station and system for domestic animal dental care in FIG. 16.
Figure 22:
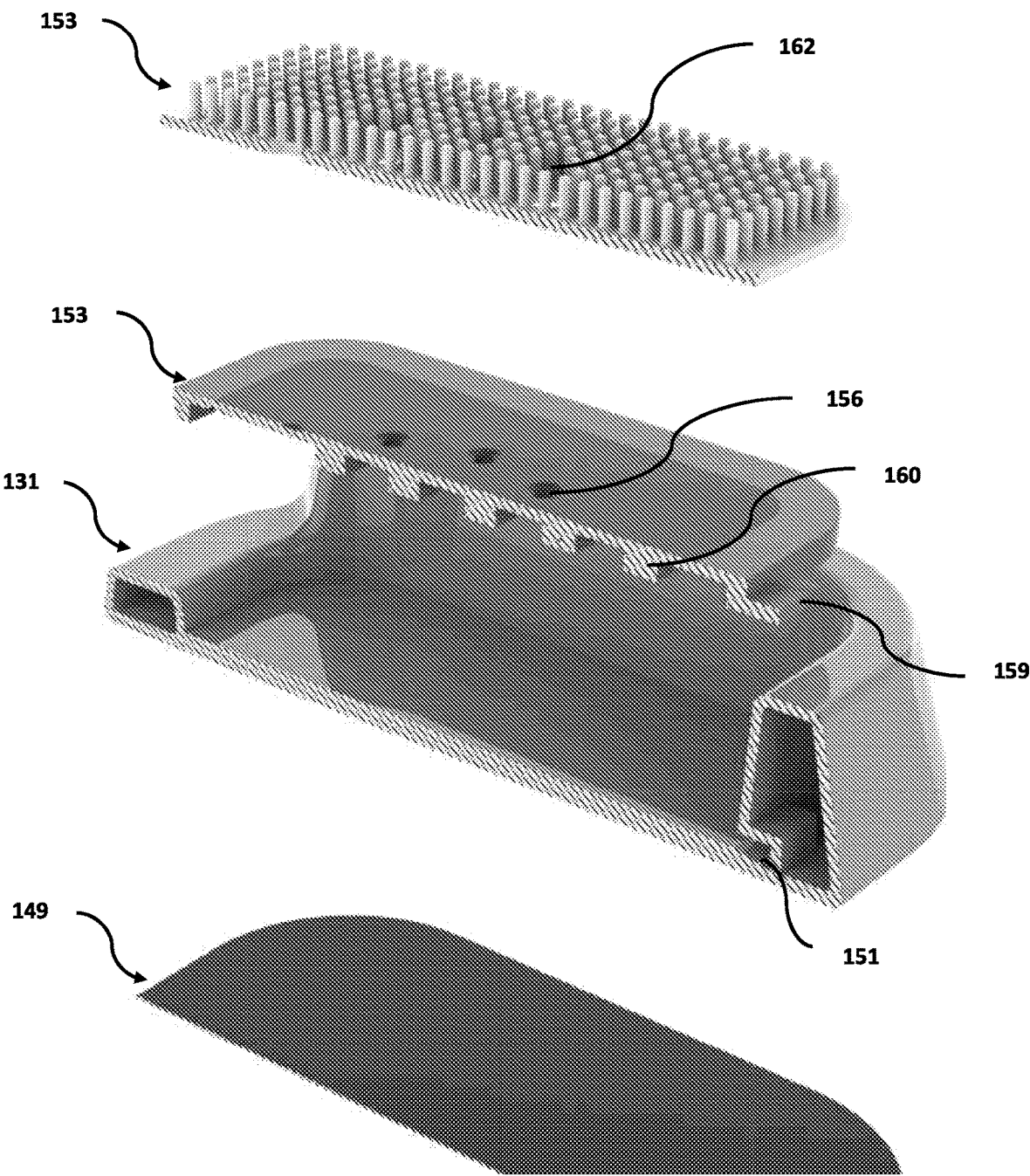
FIG. 22 is a schematic exploded view of the dental station and system for domestic animal dental care in FIG. 21.

Referring to FIGS. 12 to 15 there is shown a further embodiment of the present invention providing an alternative dental station 130. The dental station 130 comprises a shaped depot 131 having a floor section 132 (see FIG. 14), a perimeter wall 133 and a front recessed or shallow wall 134 to allow access to the depot for a domestic animal in a forward orientation. The perimeter wall further includes holding receiving formations 135 adapted to receive and hold a preselected shaped sized chew food element 136. A rear section of the floor and wall of the depot includes a recess opening 137 and a front portion of the floor close to the front recessed or shallow wall 134 is a longitudinal opening 138 in the floor. As best shown in FIGS. 21 and 22, the walls of the depot are hollow and adapted to receive a fluid material such as sand or water to weigh and therefore add stability to the station when accessed by an animal for dental cleaning.

Figure 13:
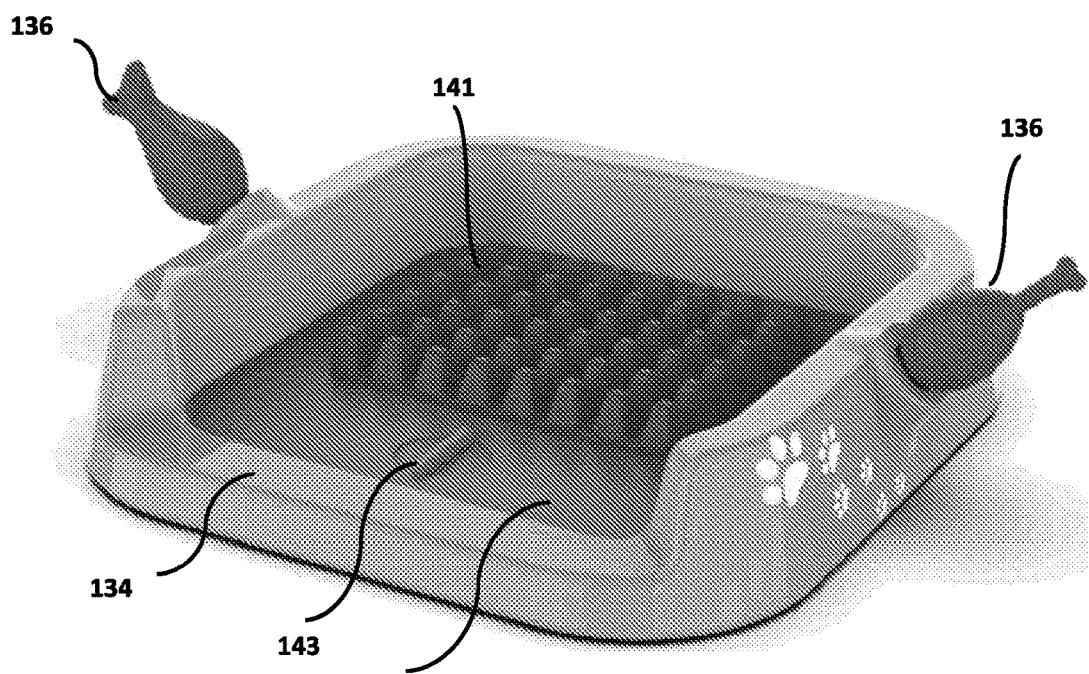
FIG. 13 is a schematic view of the dental station and system for domestic animal dental care of FIG. 12 from a different side elevation.

The dental station 130 further includes a frame plate 139 sized and shaped to fit the floor of the depot. The frame plate having a frame part 140 surrounding a window opening to receive a food block 141 therethrough, and a locking opening 142 in the frame for receiving a locking tab 146 on locking knob 143. The preselected shaped sized food block 141 as shown in FIG. 13 comprises a plurality of rows and columns of a shaped chew pieces thereon having a substantially square frustum configuration with trapezoidal faces.

Figure 15:
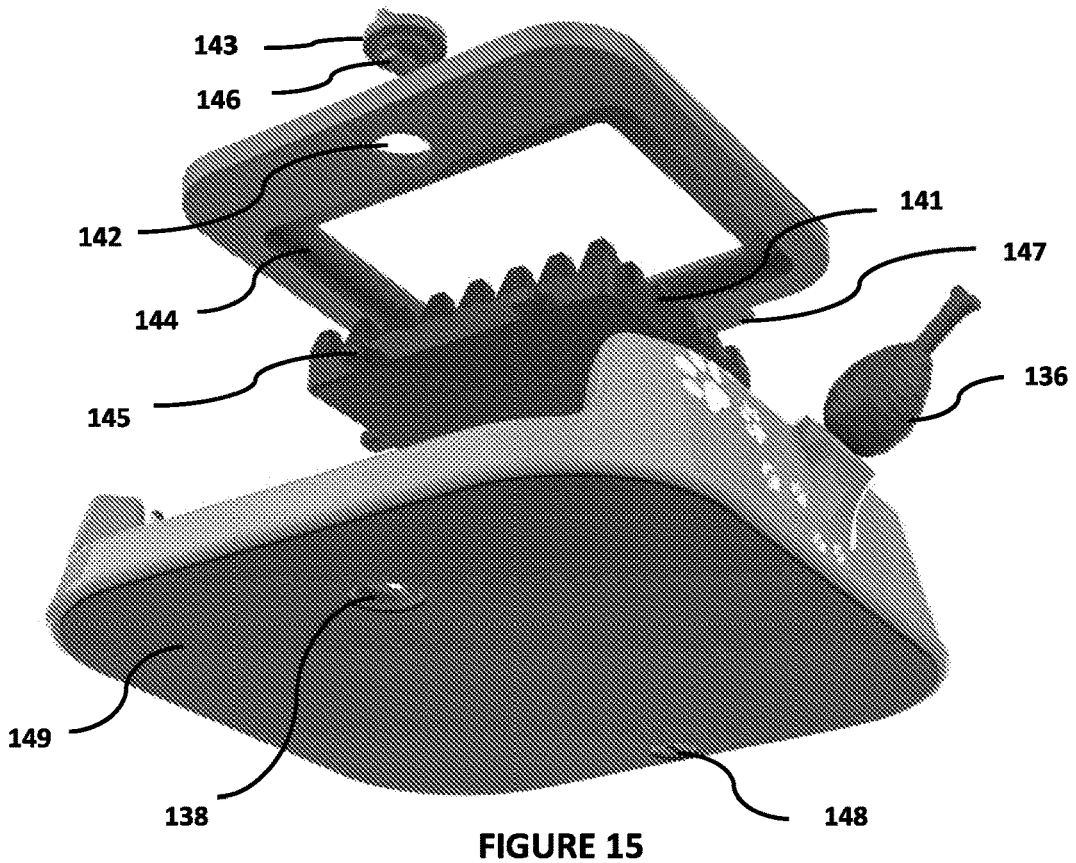
FIG. 15 is a schematic exploded view of the dental station and system for domestic animal dental care in FIG. 14 from underneath.
Figure 16:
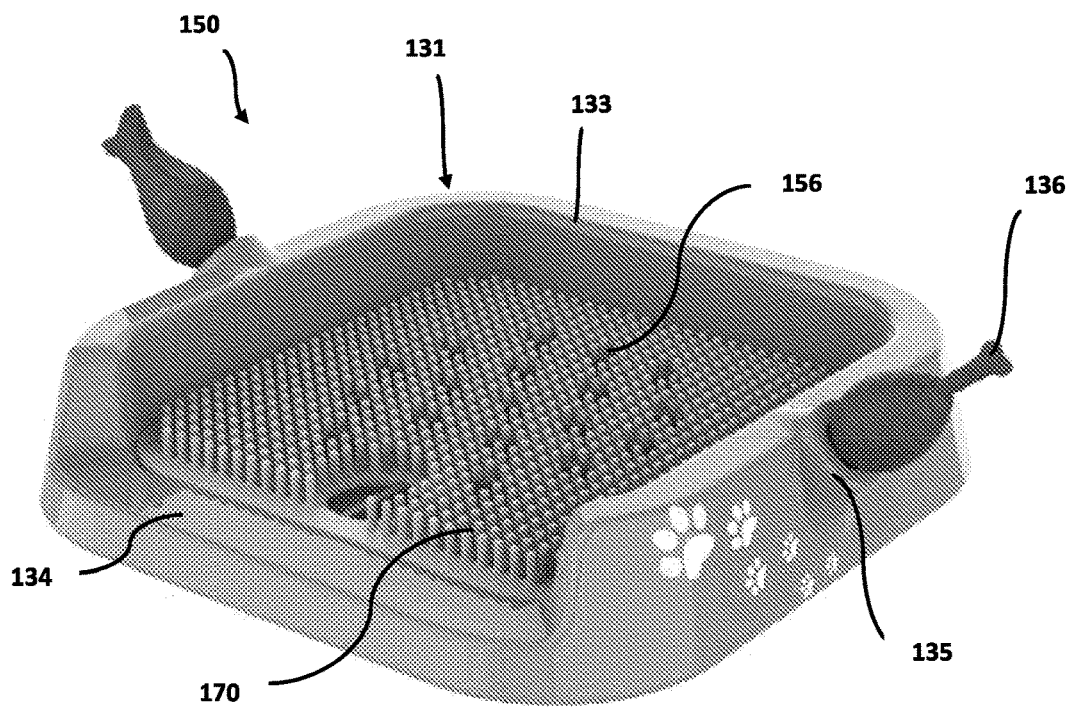
FIG. 16 is a schematic view of a dental station and system for domestic animal dental care in part side elevation in accordance with a further embodiment of the present invention.
Figure 17:
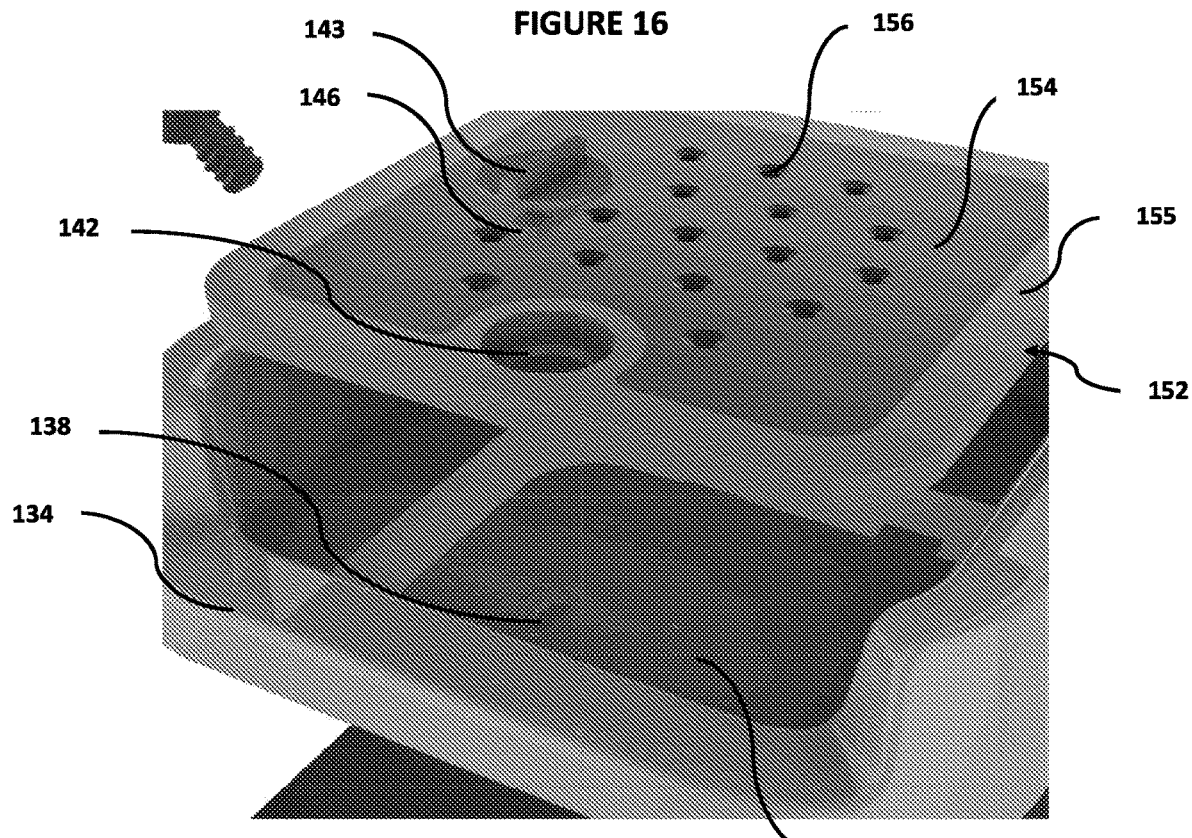
FIG. 17 is a schematic exploded view of part of the dental station and system for domestic animal dental care in FIG. 16.

As shown in FIG. 15 an underneath portion of the frame plate 139 includes a recess perimeter 144 about the window opening adapted to receive flange elements 145 of the food block 141 therein so as to securely retain the food block sandwiched between the floor and frame plate for access. In this embodiment, the food block 141 has a square or rectangular base generally corresponding to the shape of the recess perimeter 144, however it is understood that the shape of the recess perimeter, window opening, and food block can be varied.

The relative orientation of the front recessed wall 134 and the shaped sized food block 141 means the domestic animal is constrained to facing forward toward the food block 141 in the depot and as such the animal is influenced to chew the food elements using its front teeth. The frame plate 139 acts to retain the food block substantially in position in the depot for consumption. The combination of food elements 141 and 136 allows for and indeed encourages chewing and scraping of front, rear, right and left teeth of the animal.

The frame plate further includes a tab member 147 extending rearwardly from a portion of the frame part adapted to be received in a releasably locking position in recess opening 137.

In an assembled condition as shown in FIG. 15, the frame plate 139 is positioned over the food block 141 so that flange elements 145 thereof are received by the recess perimeter 145 of the frame plate and tab member 147 is slidably received in recess opening 137. As further shown in FIG. 15, the depot 131 includes a substantially non-slip fitted rubber matt 149 which increases friction with a supporting surface and an access port 148 with plug 168 in the rear of the floor for allowing pouring in of fluid material such as sand or water for added stability. When the frame plate and food block are in position, the locking knob 143 is inserted within the opening 142 and locking tab is received through locking opening 142. Thereafter the locking knob is turned to alter the orientation of the locking tab with respect to the locking opening 142 to retain the frame plate on the floor over the food block. A portion of the food block is adapted to sit proud of the frame plate. The configuration of the depot together with the preselected shape and size of the food block helps to orient a domestic animal so the front teeth of a domestic animal are preferentially cleaned.

Figure 18:
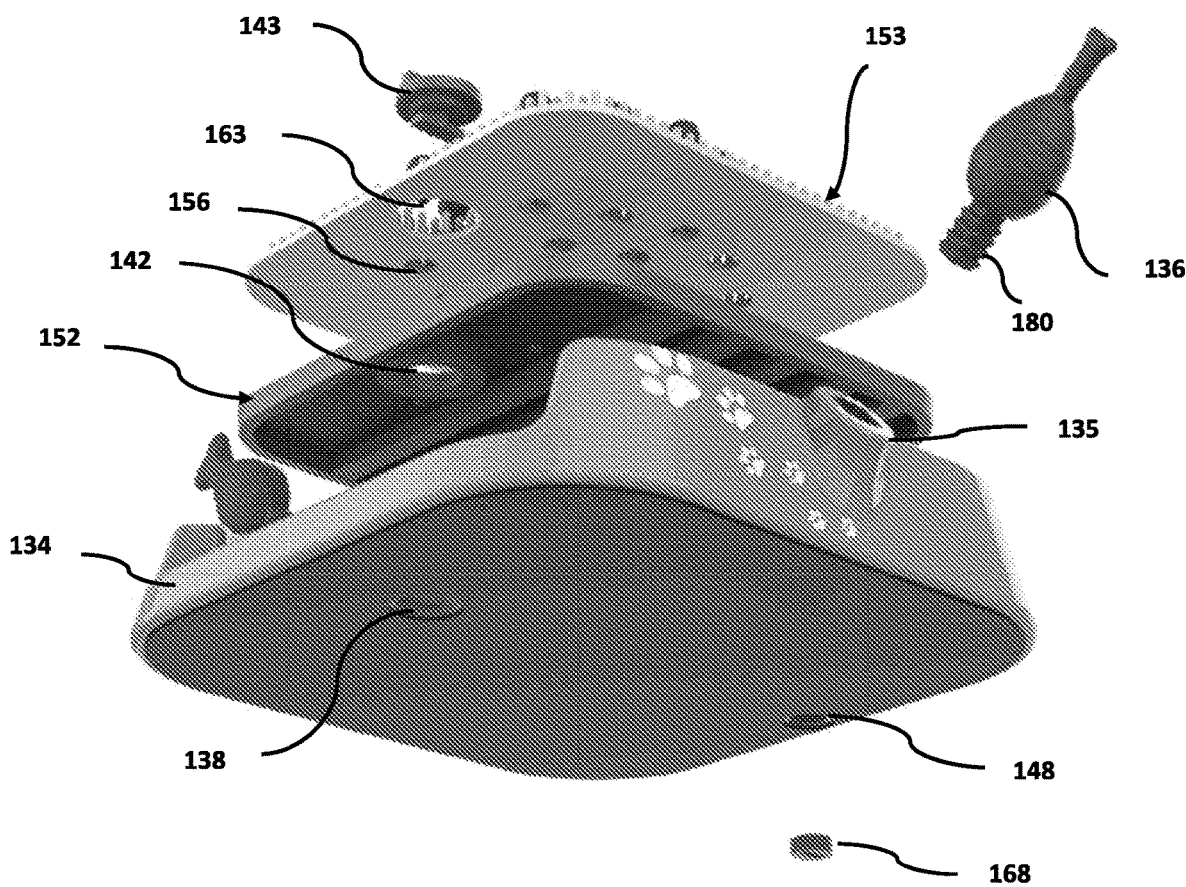
FIG. 18 is a schematic exploded view of the dental station and system for domestic animal dental care in FIG. 16.
Figure 19:
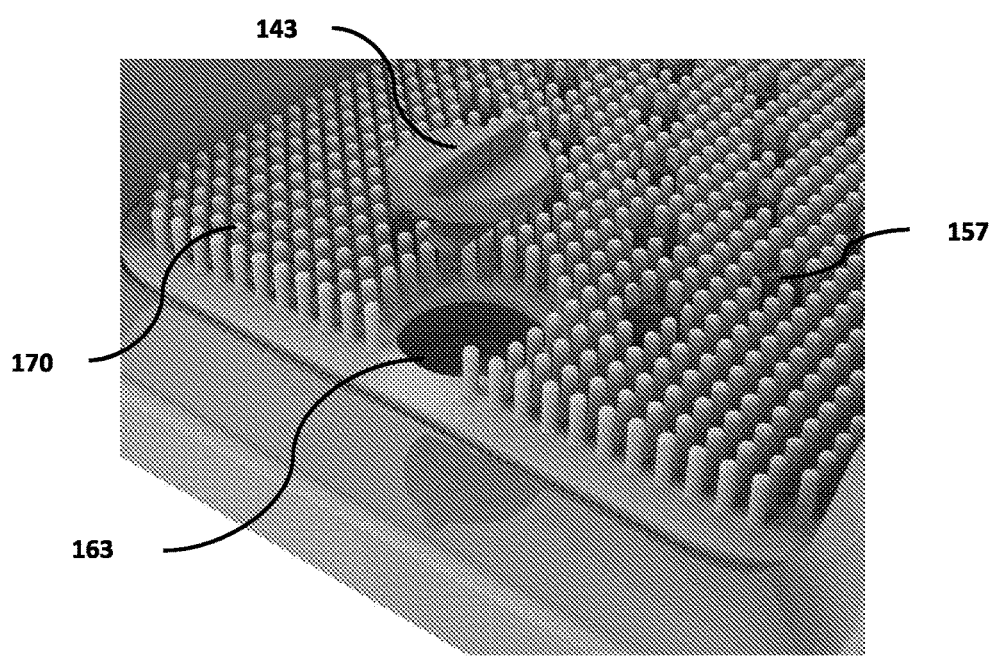
FIG. 19 is a schematic close-up view of front portion of the dental station and system for domestic animal dental care in FIG. 16.

FIGS. 16 to 22 show a further embodiment of the dental station in accordance with the present invention showing an alternative dental station 150. The dental station 150 comprises a shaped depot 131 having a floor section 132 (see FIG. 17), a perimeter wall 133 and a front recessed or shallow wall 134 to allow access to the depot for a domestic animal in a particular orientation. The perimeter wall further includes holding receiving formations 135 adapted to receive and hold a preselected shaped sized chew food elements 136. As shown in FIG. 18, the chewable food elements can be of any shape however they include an externally threaded hollow insert stem 180 adapted to be received by mating complimentary threaded section in the holding receiving formations 135. In this way the chews are substantially anchored to the holding formations and therefore easy to insert and replace but problematic for easy removal by an animal. The hollow insert stem also allows removal with an insert tool from the holding formation for replacement.

A side section of the floor and wall (see FIG. 22) of the depot includes a recess opening 151, and a front portion of the floor close to the front recessed wall includes a longitudinal opening 138 in the floor. As best shown in FIGS. 21 and 22, the walls of the depot are hollow and adapted to receive a fluid material such as sand or water to weigh and therefore add stability to the station when accessed by an animal for dental cleaning.

The dental station 150 further comprises a brush plate 153 and an intermediate support plate 152 disposed between the floor of the support structure and the brush plate in an assembled condition. The support plate 152 includes a molded rubber central portion 154 and a plastic frame border 155. The rubber central portion 154 includes a plurality of malleable/flexible openings 156 forming a holding means adapted to receive and locate preselected sized and shaped chewable food elements 157. The support plate further includes a locking opening 158 in a forward portion of the plastic border coinciding with locking opening 163 of the brush plate 153 for receiving a locking tab 146 on a locking knob 143.

As shown in FIG. 22 the support plate also includes a flange 159 extending from a portion of the plastic border 155 which is adapted to releasably and slidably engage with the recess opening 151. The support plate further includes a series of spaced apart rib members 160 adding structural strength to the central portion 154.

The brush plate 153 comprises a plastic molded plate having rows of upright brushing members 161 forming a brush field 170, interspersed with a plurality of inserts 162 for receiving the food members 157 therethrough. The inserts 162 are aligned with the each flexible openings 156 in the support plate. The chewable food elements are shown including a barbed insertion head and a shaped spherical chewable head spaced by a stem. The insertion head is adapted to extend through an insert 162 in the brush plate and penetrate the corresponding aligned flexible opening 156 in the support plate, wherein once received by the flexible opening 162 the barbed head substantially prevent removal of and maintains the head exposed within the brush field and assists retaining the brush plate 153 in connection with the support plate 152.

Figure 20:
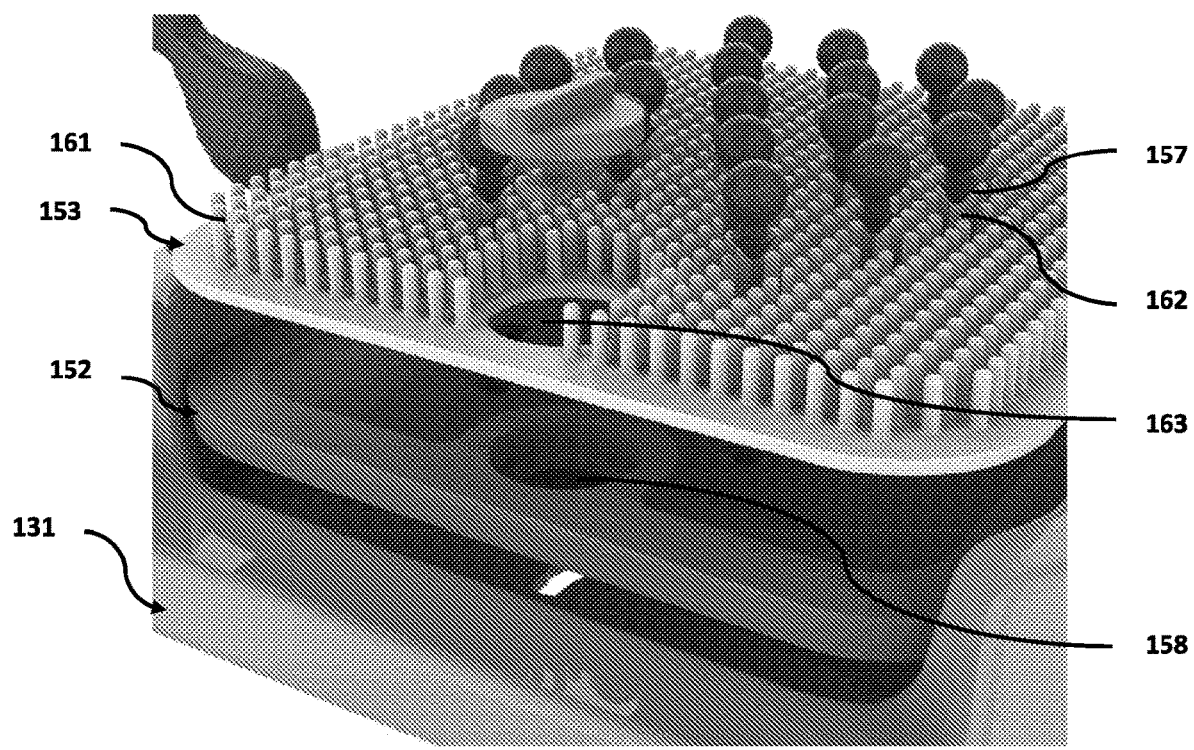
FIG. 20 is a schematic close-up exploded view of the dental station and system for domestic animal dental care in FIG. 16.

The brush plate further includes a forward opening 163 aligned with opening 158 and 138 for receiving the locking knob 143 and locking tab 142. In an assembled condition as shown in FIGS. 20 to 22, the support plate 153 is received on the floor of the depot and flange 159 is received by mating recess 151. In this position the opening 158 is aligned with the opening 138 in the floor of the depot. The brush plate 153 is then disposed over the support plate and opening 163 and inserts 162 are aligned with corresponding openings 158 and 156 respectively. The preselected chewable food elements 157 are inserted in inserts 162 and received by corresponding aligned openings 156 in the support plate wherein the barbed head of the chewable food acts as an anchor to assist to retain the brush plate to the support plate.

When the brush plate and support plate are in position, and food elements have been inserted and received by the openings 156, the locking knob 143 is inserted within the opening 163 and 142 and locking tab is received through locking opening 138 in the floor of the depot. Thereafter the locking knob is turned to alter the orientation of the locking tab with respect to the locking opening 138 to retain the frame plate on the floor over the food block. As further shown in FIG. 22, the depot can include a substantially non-slip rubber matt 149 fitted underneath the floor, which increases friction with a supporting surface. The floor of the depot also has an access port 148 with plug 168 in the rear of the floor for allowing pouring in of fluid material such as sand or water for added stability.

In this embodiment, the plurality of chewable foods interspersed within the brush field encourages domestic animals to search and explore for the treat at the same time orienting the animal, i.e. restricting the entry to the depot thereby allowing exposure of the animal's teeth to brushing by the brush field. The brush field and food elements effectively clean a range of an animal's teeth.

Benefits of the dental station of the invention include the following:
a. The supporting structure can include a structure which aids in tending the domestic animal to use the one or more of a plurality of preselected sized and shaped chewable food elements held in a protruding manner to encourage use of at least one set of particular teeth of the domestic animal.
b. Encourages domestic animal like canine to graze on shaped chewable food elements on both sides of oral cavity;
c. Different chews and locations help to cleans all teeth, i.e., anterior and posterior teeth and all surfaces;
d. Physical hindrance created by the configuration of the dental station orients an animal to left and right chewing and inside and outside surfaces of tooth cleaning;
e. The dental station can accommodate a plurality of animals at the same time Interpretation

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to a dental device for aiding dental hygiene of domestic pets.

The invention claimed is:

1. A dental station for providing dental care to domestic animals, comprising:
   a body having a supporting structure including shaped walls configured to define one or more depots for access by the domestic animal,
   each depot includes a plurality of holding formations configured to receive and support at least one chewable food element for access by the domestic animal for chewing,
   wherein, the plurality of holding formations are located on the shaped walls of each depot and the at least one chewable food element extend from the shaped walls into the one or more depots from a predetermined direction and height within each depot is orientated to encourage the domestic animal to use a predetermined set of teeth to access the chewable food element such that to chew the chewable food elements in one of the one or more depots the domestic animal must utilize a different set of teeth than is required to chew the at least one chewable food element presented in at least one of the other depots and wherein the set of teeth used by the domestic animal to chew the chewable food element is cleaned during the chewing action at the depot.

2. A dental station according to claim 1, wherein the holding formations present the at least one chewable food element in a protruding manner to encourage use of a predetermined set of teeth of the domestic animal.

3. A dental station according to claim 2, wherein the predetermined set of teeth of the domestic animal includes at least one of canines, incisors, premolars and molars.

4. A dental station according to claim 1, wherein the chewable food elements are held proud of the shaped walls by the holding formations.

5. A dental station according to claim 4, wherein the chewable food elements is held proud of the shaped walls adjacent at least one protruding teeth engaging formation, wherein as the domestic animal chews the chewable food elements the protruding teeth engaging formation engage the teeth of the domestic animal in a cleaning manner.

6. A dental station according to claim 5, wherein the at least one protruding teeth engaging formation is resiliently flexible.

7. A dental station according to claim 5, wherein the at least one protruding teeth engaging formation are tentacle formations.

8. A dental station according to claim 1, wherein the supporting structure includes shaped floors configured to define the one or more depots for the domestic animal and the plurality of holding formations are located on the shaped floors.

9. A dental station according to claim 8, wherein the chewable food elements extend from the shaped floors into the one or more depots from a predetermined direction and height within the depot to encourage the domestic animal to use a predetermined set of teeth to access the chewable food element.

10. A dental station according to claim 1, wherein each depot has a plurality of holding formations provided therein to receive and hold a plurality of chewable food elements for access by the domestic animal.

11. A dental station according to claim 1, wherein the supporting structure has a plurality of depots with holding formations configured to receive and support one or more of a plurality of preselected sized and shaped chewable food elements in a protruding manner wherein the domestic animal can progress from depot to depot to achieve cleaning of different sets of particular teeth of the domestic animal.

* * * * *